(12) United States Patent
Normington (10) Patent No.: US 7,516,166 B2
(45) Date of Patent: Apr. 7, 2009

(54) RESOURCE LOADING

(75) Inventor: Glyn Normington, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 11/301,974

(22) Filed: Dec. 13, 2005

(65) Prior Publication Data

US 2006/0136401 A1 Jun. 22, 2006

(30) Foreign Application Priority Data

Dec. 16, 2004 (GB) ................................. 0427670.5

(51) Int. Cl.
*G06F 17/30* (2006.01)
(52) U.S. Cl. ........................... 707/201; 707/205; 707/3; 707/8; 707/10
(58) Field of Classification Search ...................... 707/8
See application file for complete search history.

(56) References Cited

U.S. PATENT DOCUMENTS

| 6,256,636 | B1 | 7/2001 | Choy | 707/103 |
| 7,184,917 | B2 * | 2/2007 | Pramanick et al. | 702/120 |
| 2002/0184612 | A1 | 12/2002 | Hunt et al. | 717/116 |
| 2003/0149960 | A1 | 8/2003 | Inamdar et al. | 717/118 |

* cited by examiner

*Primary Examiner*—Cam Y T Truong
(74) *Attorney, Agent, or Firm*—Stephen A. Calogero, Esq.; Steven M. Greenberg, Esq.; Carey Rodriguez Greenberg & Paul LLP (57) ABSTRACT

A method loads a resource in a software application. The software application comprises an ordered search path identifying at least one of a plurality of resource containers. Each of the resource containers includes a timestamp and an index in the ordered search path. The method includes loading a resource from an originating resource container, the originating resource container having an index in the ordered search path, identifying a set of resource containers in the ordered search path, each of the set of resource containers having an index less than or equal to the index of the originating resource container, generating a cached resource as a copy of the loaded resource, the cached resource comprising the index of the originating resource container and a cached resource timestamp, the cached resource timestamp corresponding to a maximum timestamp of the resource containers in the set of resource containers, and marking the cached resource as invalid in response to a determination that a resource container in the set of resource containers has a timestamp later than the cached resource timestamp, and the identified resource container comprises the cached resource.

6 Claims, 13 Drawing Sheets

RESOURCE LOADING

BACKGROUND OF THE INVENTION

The present invention relates to loading resources in software applications, and more particularly, to detecting stale cached resources.

Software applications are often arranged as a suite of separate software components or resources. A main component or runtime environment will import resources from resource containers in order to operate as a complete software application. For example, an application may locate and access runtime functions stored in dynamic link libraries, or classes stored in class libraries. In order to locate such resources, a search path is used to indicate the location(s) of one or more such resource containers. For example, in the Java™ runtime environment a CLASSPATH environment variable can be used to define where classes can be found (Java is a trademark of Sun Microsystems Corp. in the United States, other countries, or both). The CLASSPATH is a list of locations (such as directories in a file system or fully qualified class library locations) and is used at runtime when a new class is loaded. Such search paths are ordered such that the application searches for required resources at a first location, before proceeding to subsequent locations in a sequential manner.

Figure 1:
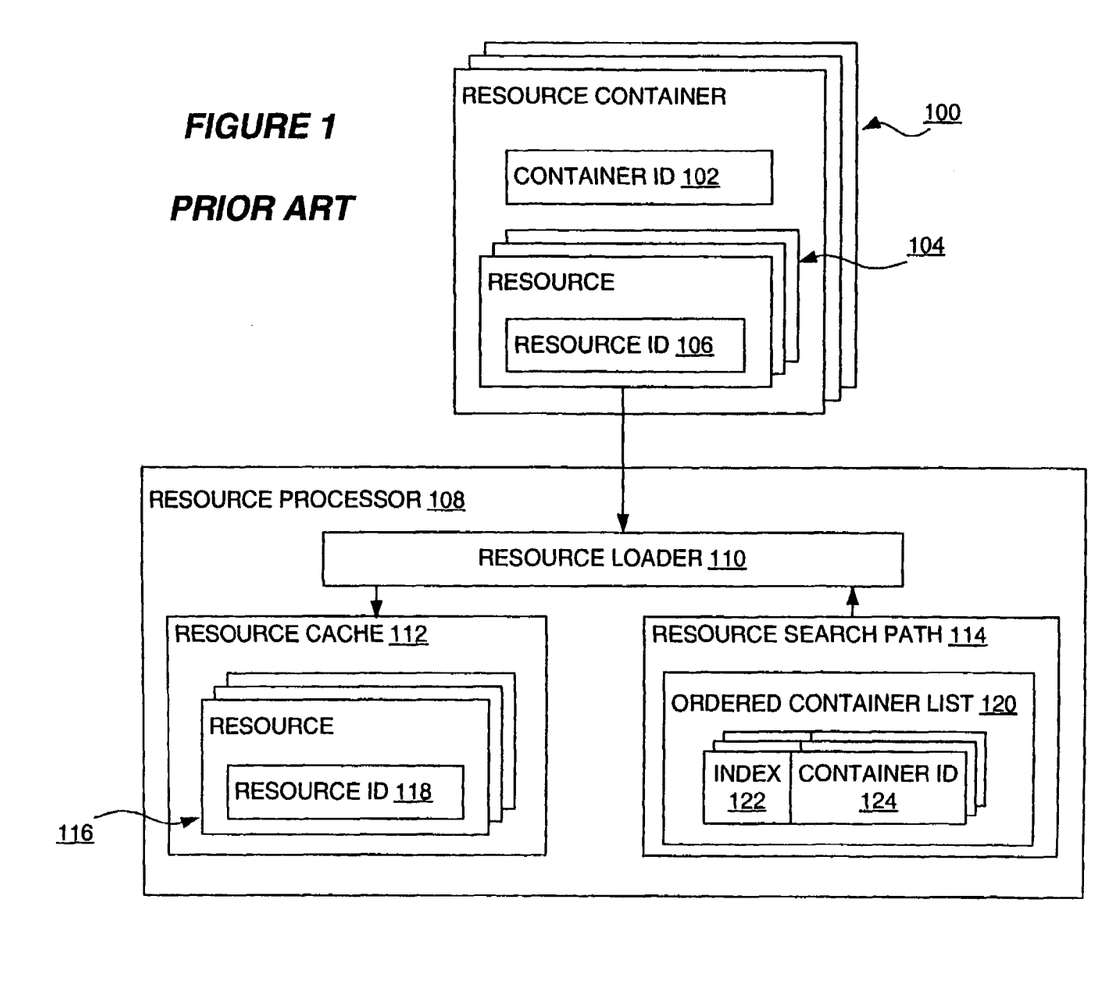
FIG. 1 is a block diagram of a resource processor for loading resources from one or more resource containers in the prior art.

FIG. 1 is a block diagram of a resource processor 108 for loading resources from one or more resource containers 100 in the prior art. The resource processor 108 can be an application at runtime, or a runtime environment such as a Java virtual machine. The one or more resource containers 100 can be, for example, library files, class files, Java archive (jar) files or directories in a file system. Each of the resource containers 100 has a container identifier 102 such as the container name (e.g. a fully qualified jar file name or a fully qualified directory name). Within a resource container 100 can reside one or more resources 104. The one or more resources 104 can be, for example, class files or runtime libraries. Each of the resources 104 has an identifier, such as a class file name.

The resource processor 108 includes a resource loader 110 such as a class loader. The resource loader 110 is able to locate a resource 104 in a resource container 100 and load it into a memory of the computer system for use by the resource processor 108. The resource processor 108 further comprises a resource cache 112, which is a reserved section of memory in a computer system for storing one or more resources 116 which have been loaded from resource containers 100. The resource cache 112 can be a shared memory cache serving multiple resource loaders (not shown) or multiple resource processors (not shown). For example, the resource cache 112 can serve multiple Java class loader instances. The resource cache 112 can therefore exist outside the resource processor 108, such as on a separate computer system communicatively connected to the resource processor 108. The resources 116 stored in the resource cache 112 can be stored based on usage criteria, such as most frequently used resources. Each of the resources 116 in the resource cache 112 includes a resource identifier 118. It will be appreciated that the resources 116 stored in the resource cache 104 substantially reflect the resources 104 stored in resource containers 100 when they are loaded into the resource cache 112 by the resource loader 110. Thus, the resources 116 stored in the resource cache 112 are copies of the resources 104 stored in resource containers 100.

When searching for a particular resource the resource loader 110 uses a resource search path 114. The resource search path 114 includes an ordered container list 120 which is a list of resource containers. Each entry in the resource search path 114 includes an index 122 (the means by which the ordered container list 120 is ordered) and a container identifier 124 (corresponding to a container identifier 102 of one of the resource containers 100).

At runtime, the resource processor 108 requests that the resource loader 110 loads a particular resource identified by a resource identifier 106. The resource loader 110 first checks if the required resource is resident in the resource cache 112. If so, the resource can be quickly loaded from the resource cache 112. If not, the resource loader 110 locates the resource by searching sequentially through each of the resource containers in the ordered container list 120 of the resource search path 114. When a resource container is located with the required resource identifier 106 the resource loader 110 loads the required resource and may further add the loaded resource to the resource cache 112.

BRIEF SUMMARY OF THE INVENTION

According to a first aspect of the present invention, a method loads a resource in a software application. The software application comprises an ordered search path identifying at least one of a plurality of resource containers. Each of the resource containers having a timestamp and an index in the ordered search path. The method comprises loading a resource from an originating resource container, the originating resource container having an index in the ordered search path, identifying a set of resource containers in the ordered search path, each of the set of resource containers having an index less than or equal to the index of the originating resource container, generating a cached resource as a copy of the loaded resource, the cached resource comprising the index of the originating resource container and a cached resource timestamp, the cached resource timestamp corresponding to a maximum timestamp of the resource containers in the set of resource containers, and marking the cached resource as invalid in response to a determination that a resource container in the set of resource containers has a timestamp later than the cached resource timestamp, and the identified resource container comprises the cached resource.

According to another aspect of the present invention, an apparatus loads a resource in a software application. The software application comprises an ordered search path identifying at least one of a plurality of resource containers. Each of the resource containers includes a timestamp and an index in the ordered search path. The apparatus comprises a loading module loading a resource from an originating resource container, the originating resource container having an index in the ordered search path, an identification module identifying a set of resource containers in the ordered search path, each of the set of resource containers having an index less than or equal to the index of the originating resource container, a generation module generating a cached resource as a copy of the loaded resource, the cached resource comprising the index of the originating resource container and a cached resource timestamp, the cached resource timestamp corresponding to a maximum timestamp of the resource containers in the set of resource containers, and a marking module marking the cached resource as invalid in response to a determination that a resource container in the set of resource containers has a timestamp later than the cached resource timestamp and the identified resource container comprises the cached resource.

According to yet another aspect of the present invention, a computer program product loads a resource in a software application. The software application comprises an ordered search path identifying at least one of a plurality of resource containers. Each of the resource containers includes a timestamp and an index in the ordered search path. The computer program product comprises a computer usable medium having computer useable program code embodied therewith. The computer useable program code comprises computer usable program code configured to load a resource from an originating resource container, the originating resource container having an index in the ordered search path, computer usable program code configured to identify a set of resource containers in the ordered search path, each of the set of resource containers having an index less than or equal to the index of the originating resource container, computer usable program code configured to generate a cached resource as a copy of the loaded resource, the cached resource comprising the index of the originating resource container and a cached resource timestamp, the cached resource timestamp corresponding to a maximum timestamp of the resource containers in the set of resource containers, and computer usable program code configured to mark the cached resource as invalid in response to a determination that a resource container in the set of resource containers has a timestamp later than the cached resource timestamp and the identified resource container comprises the cached resource.

Other aspects and features of the present invention will become apparent to those ordinarily skilled in the art or science to which it pertains upon review of the following description in conjunction with the accompanying figures.

DETAILED DESCRIPTION OF THE INVENTION

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit" or "module." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-usable or computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
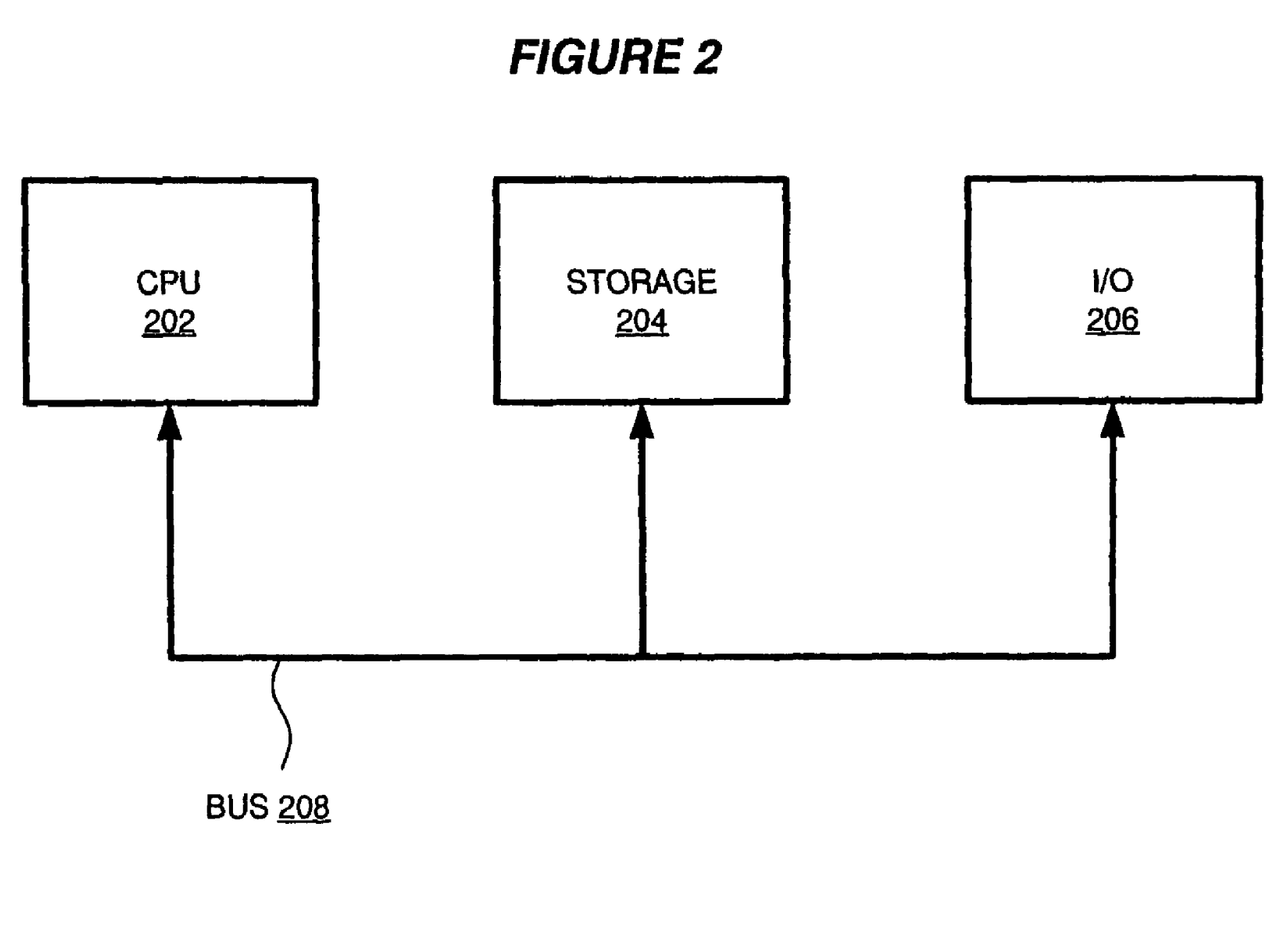
FIG. 2 is a block diagram of a computer system suitable for the operation of embodiments of the present invention.

FIG. 2 is a block diagram of a computer system suitable for the operation of embodiments of the present invention. A central processor unit (CPU) 202 is communicatively connected to a storage 204 and an input/output (I/O) interface 206 via a data bus 208. The storage 204 can be any read/write storage device such as a random access memory (RAM) or a non-volatile storage device. An example of a non-volatile storage device includes a disk or tape storage device. The I/O interface 206 is an interface to devices for the input or output of data, or for both input and output of data. Examples of I/O devices connectable to I/O interface 206 include a keyboard, a mouse, a display (such as a monitor) and a network connection.

Figure 3:
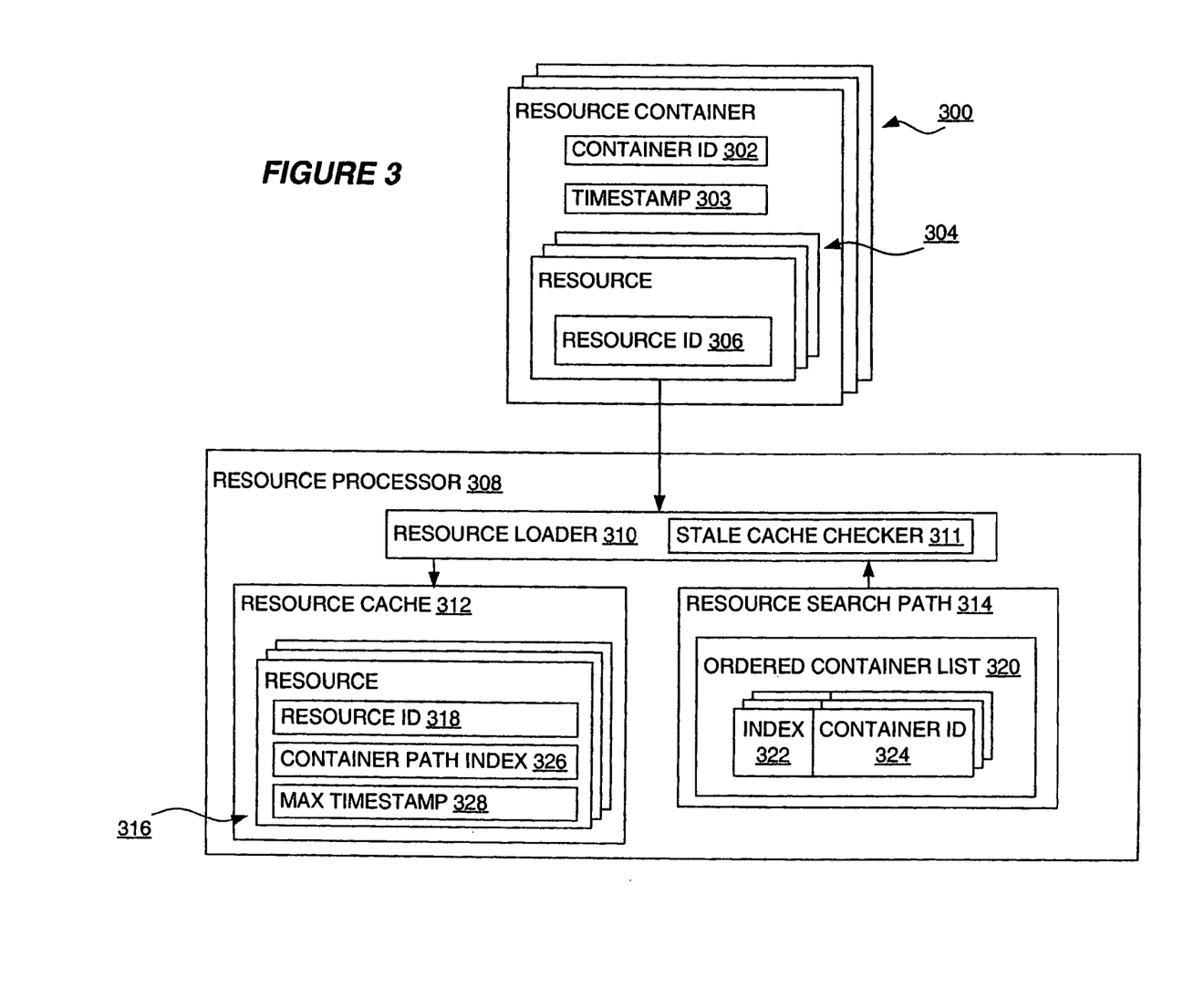
FIG. 3 is a block diagram of a resource processor for loading resources from one or more resource containers in accordance with an aspect of the present invention.

FIG. 3 is a block diagram of a resource processor 308 for loading resources from one or more resource containers 300 in accordance with an aspect of the present invention. Many of the elements of FIG. 3 are identical to those described above with respect to FIG. 1 and these will not be repeated here. Each of the resource containers 300 of FIG. 3 further include a timestamp 303 which reflects the creation time of a resource container or the time of the most recent modification to the resource container. For example, the timestamp 303 can be a date and time attribute of a jar file. Alternatively, the timestamp 303 could be stored in an ordered container list 320, which is described in detail below. Furthermore, the resources 316 stored in the resource cache 312 include, in addition to the resource identifier 318, a container path index 326 and a maximum timestamp 328. The container path index 326 is an index of a resource container in the ordered container list 320 which contains the resource. The maximum timestamp 328 is the latest (highest) timestamp of all of the resource containers in the ordered container list 320 up to and including the resource container with the container path index 326. A method for calculating the maximum timestamp 328 is considered in detail below with respect to FIG. 4d. Additionally, the resource loader 310 includes a stale cache checker 311 which determines whether resource in the resource cache 312 is stale. A resource in the resource cache 312 is stale if a newer version of the resource would be loaded from one of the resource containers 300 in an equivalent system without a resource cache 312. A method of the stale cache checker 311 for determining if a resource is stale is considered in detail below with respect to FIG. 4c.

Figure 4A:
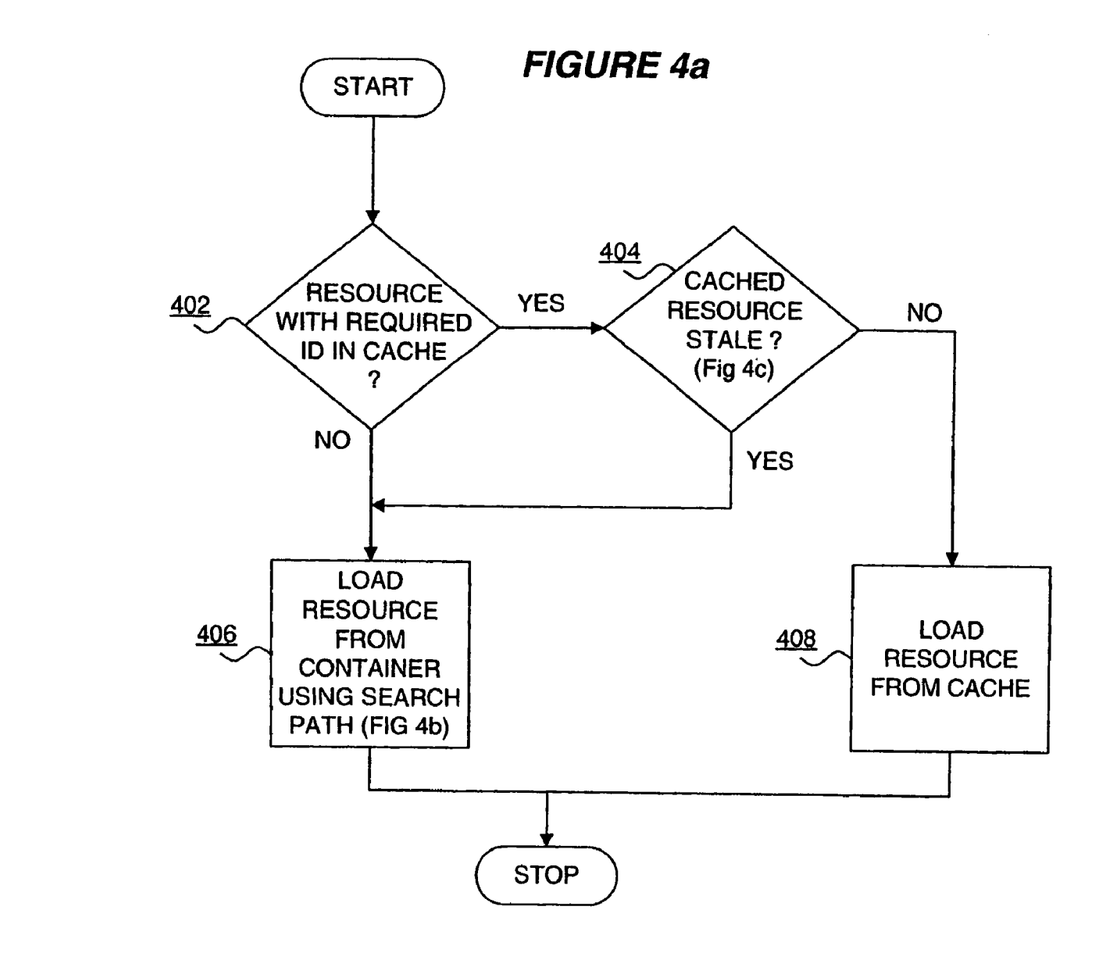
FIG. 4a is a flowchart for a method of the resource loader of FIG. 3 to load a resource with a required resource identifier in accordance with an aspect of the present invention.

FIG. 4a is a flowchart for a method of the resource loader 308 of FIG. 3 to load a resource with a required resource identifier in accordance with an aspect of the present invention. At step 402 the resource loader 310 determines if a resource with the required resource identifier is stored in the resource cache 312. If the resource is not stored in the resource cache 312 the method proceeds to step 406 where the method loads a resource with the required resource identifier from the resource containers 300 using the resource search path 314 using the method of FIG. 4b considered in detail below. If, at step 402, a resource with the required resource identifier is stored in the resource cache 312 the method proceeds to step 404. At step 404 the stale cache checker 311 determines if the resource with the required resource identifier in the resource cache 312 is stale. This is achieved using the method of FIG. 4c considered in detail below. If step 404 determines that the resource is stale the method proceeds to step 406. Alternatively, if the resource is not stale the method proceeds to step 408 where the resource loader 310 loads the resource with the required identifier directly from the resource cache 312.

Figure 4B:
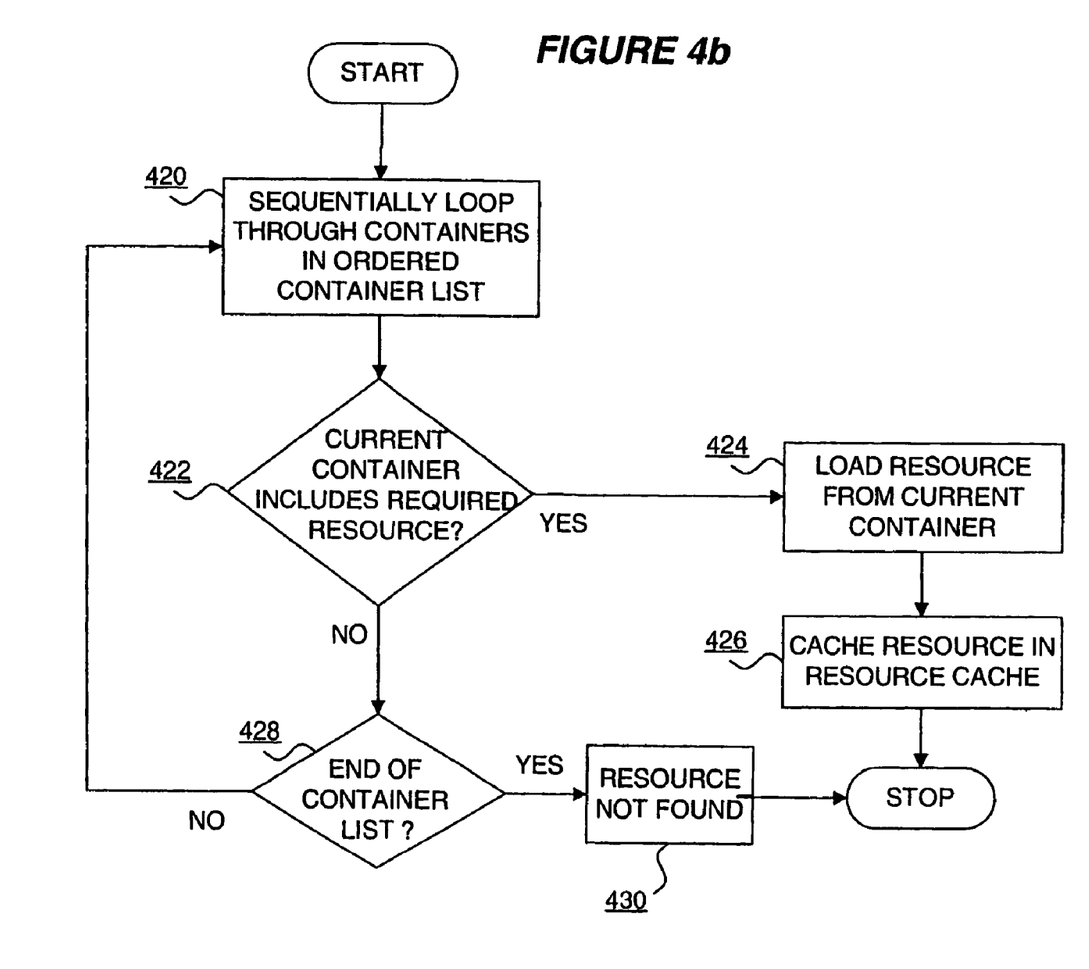
FIG. 4b is a flowchart for a method of the resource loader of FIG. 3 to load a resource with a required resource identifier from a resource container in accordance with an aspect of the present invention.

FIG. 4b is a flowchart for a method of the resource loader 310 of FIG. 3 to load a resource with a required resource identifier from a resource container in accordance with an aspect of the present invention. At step 420 a loop is initiated through all of the resource containers in the ordered container list 320. The loop of step 420 is sequential starting at a first entry in the ordered container list 320 (for example, starting at a lowest index 322). At step 422, for a current resource container in the ordered container list 320, the method determines if the current resource container contains a resource with the required resource identifier. If the current resource container does not contain a resource with the required resource identifier the method proceeds to step 428 where the method loops back to step 420 until the end of the ordered container list 320 is reached. Alternatively, if step 422 determines that the current resource container does contain a resource with the required resource identifier, the method proceeds to step 424 where the resource loader loads the resource with the required resource identifier from the current resource container. Subsequently, at step 426, the resource loader creates a cached copy of the loaded resource. In an alternative embodiment the creation of the cached copy of the resource at step 426 can be dependent upon criteria such as the frequency of use of the resource. If, after looping through all resource containers in the ordered container list 320 a resource with the required resource identifier is not located, the method notes this as step 430.

Figure 4C:
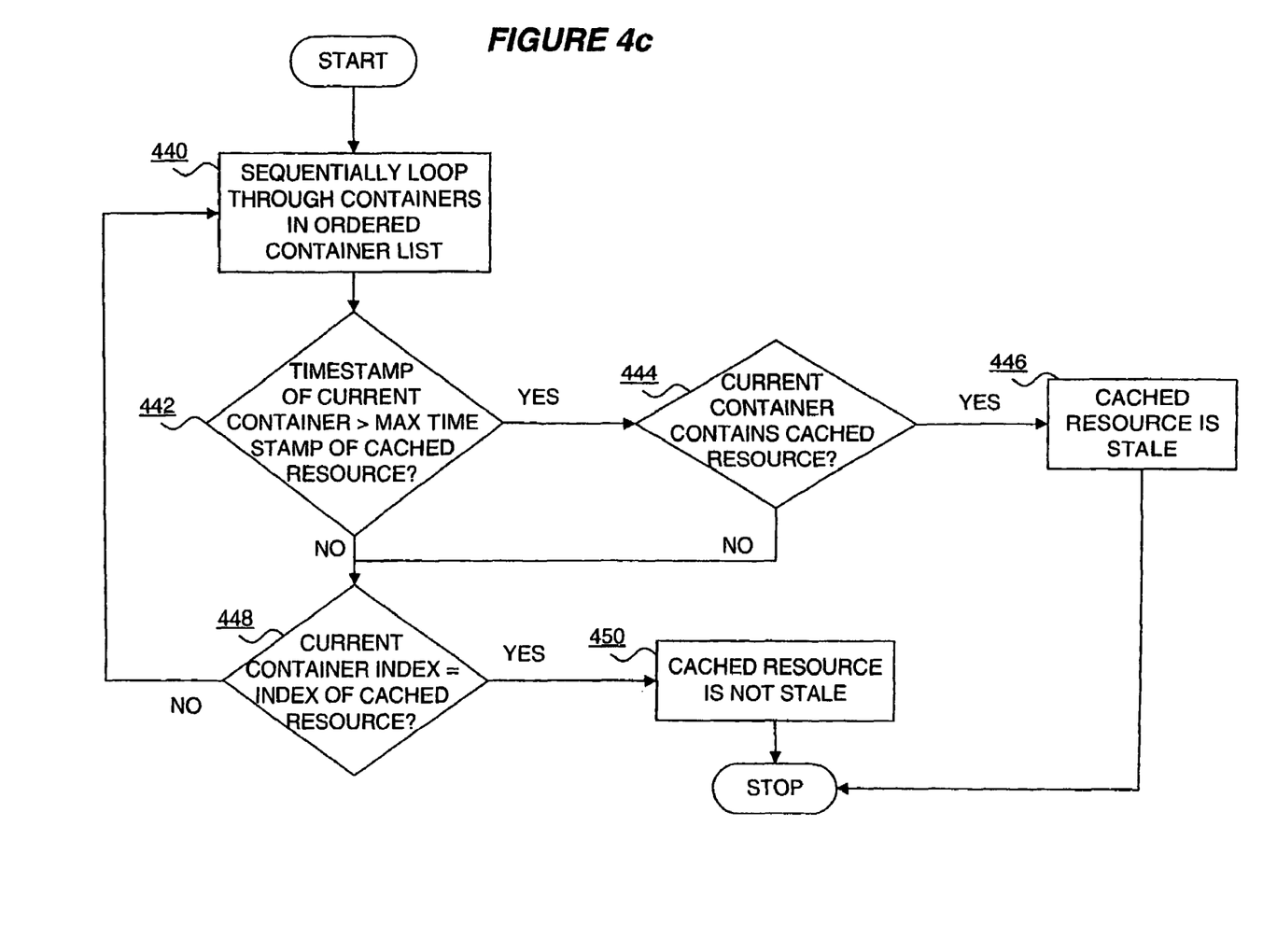
FIG. 4c is a flowchart for a method of the stale cache checker of FIG. 3 to determine if a cached resource in the resource cache of FIG. 3 is stale in accordance with an aspect of the present invention.

FIG. 4c is a flowchart for a method of the stale cache checker 311 of FIG. 3 to determine if a cached resource in the resource cache 312 of FIG. 3 is stale in accordance with an aspect of the present invention. At step 440 a loop is initiated through all of the resource containers in the ordered container list 320. The loop of step 440 is sequential starting at a first entry in the ordered container list 320 (for example, starting at a lowest index 322). At step 442, for a current resource container in the ordered container list 320, the method determines if a timestamp 303 of the current resource container is greater than the maximum timestamp 328 of the cached resource. If the timestamp 303 of the current resource container is not greater than the maximum timestamp 328 of the cached resource the method proceeds to step 448. Alternatively, If the timestamp 303 of the current resource container is greater than the maximum timestamp 328 of the cached resource the method proceeds to step 444. At step 444 the method determines if the current resource container contains a resource with the resource identifier 318 of the cached resource. If the current resource container contains a resource with the resource identifier 318 of the cached resource the method proceeds to step 446, otherwise the method proceeds to step 448. At step 446 the method determines that the cached resource is stale and the method terminates. At step 448 the method determines if the index of the current resource container in the ordered container list 320 is the same as the container path index 326 of the cached resource. If the index of the current resource container in the ordered container list 320 is not the same as the container path index 326 of the cached resource, the method loops back to step 440 for a next resource container in the ordered container list 320. Otherwise the method proceeds to step 450 where the method determines that cached resource is not stale and the method terminates. In this way the method of FIG. 4c is able to determine if a cached resource is stale by verifying that no resource container in the ordered container list 320 up to and including the resource container having the container path index 326 has a timestamp later than the maximum timestamp 328 and contains a resource with the resource identifier of the cached resource.

Figure 4D:
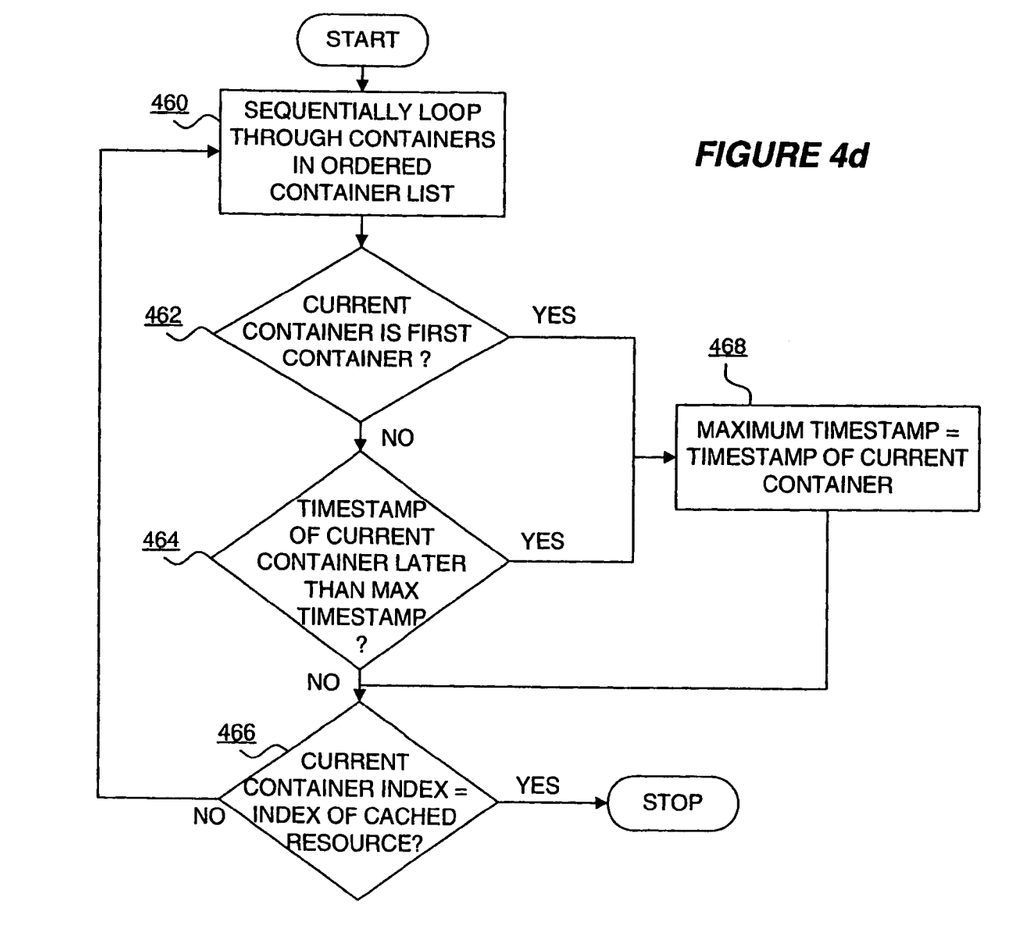
FIG. 4d is a flowchart for a method of the resource loader of FIG. 3 to calculate the maximum timestamp of a cached resource in accordance with an aspect of the present invention.

FIG. 4d is a flowchart for a method of the resource loader 310 of FIG. 3 to calculate the maximum timestamp 328 of a cached resource in accordance with an aspect of the present invention. At step 460 a loop is initiated through all of the resource containers in the ordered container list 320. The loop of step 460 is sequential starting at a first entry in the ordered container list 320 (for example, starting at a lowest index 322). At step 462, for a current resource container in the ordered container list 320, the method determines if the current resource container is the first resource container processed by the loop. If so, the method proceeds to step 468 where the maximum timestamp 328 of the cached resource is set to be the value of the timestamp of the current resource container. If step 462 determines that the current resource container is not the first resource container processed by the loop, the method proceeds to step 464 where the method determines if the timestamp of the current resource container is greater that the maximum timestamp 328. If so, the method proceeds to step 468. Alternatively, the method proceeds to step 466 where the method is looped until the current container has an index which is the same as the container path index 326 of the cached resource. In this way the method of FIG. 4d assigns a value to the maximum timestamp 328 of a newly cached resource which is the latest (highest) timestamp of all of the resource containers in the ordered container list 320 up to and including the resource container with the container path index 326.

Figure 5:
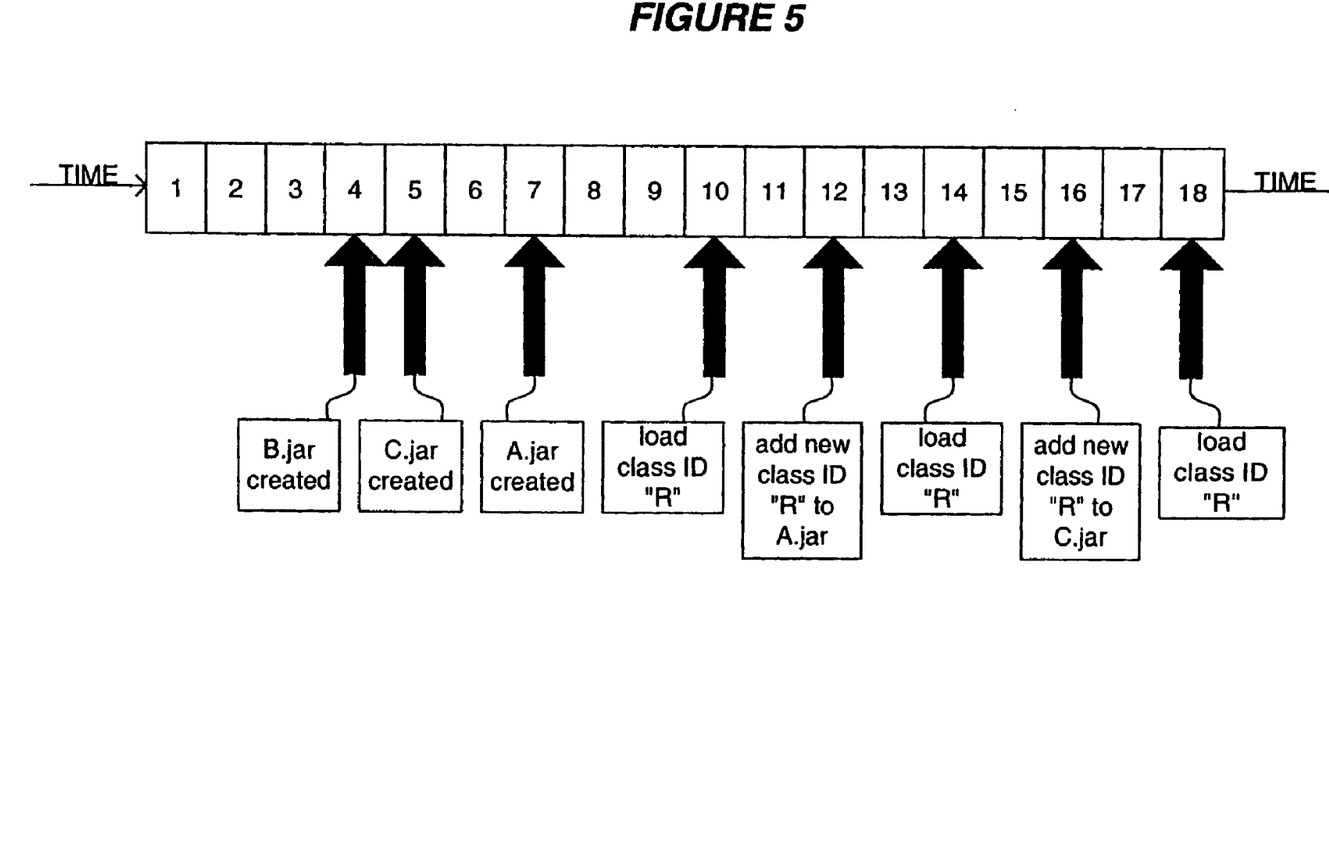
FIG. 5 is an illustration of an exemplary time line of changes to Java archive (jar) files and class loading operations in accordance with an aspect of the present invention.
Figure 6A:
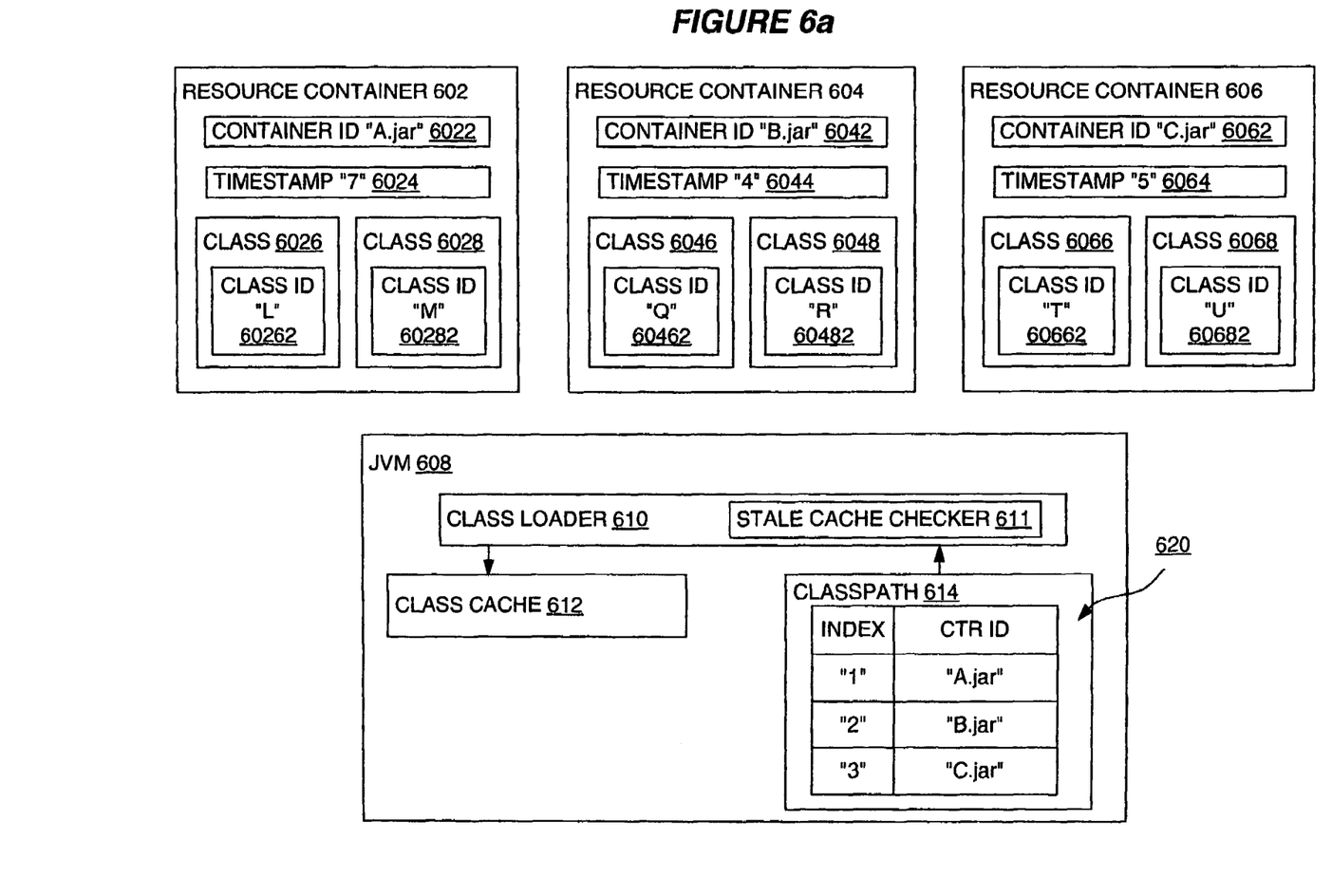
FIG. 6a is a block diagram of a Java virtual machine (JVM) for loading classes from one or more Java archive (jar) files in accordance with an aspect of the present invention.

An aspect of the present invention will now be considered in use by way of example only with reference to FIG. 5 and FIGS. 6a to 6e. FIG. 5 is an illustration of an exemplary time line of changes to Java archive (jar) files and class loading operations in accordance with an aspect of the present invention. FIG. 6a is a block diagram of a Java virtual machine (JVM) 608 for loading classes from one or more Java archive (jar) files 602, 604 and 606 in accordance with an aspect of the present invention. Considering FIG. 6a first, the JVM 608 includes a class loader 610 comprising a stale cache checker 611. The class loader 610 has generally the same function as the resource loader 310 of FIG. 3. The JVM 608 further includes a class cache 612 (analogous to the resource cache 312) and a classpath 614 (analogous to the resource search path 314) having an ordered list of jar files 620. The class cache 612 of the JVM 608 is initially empty. The classpath 614 includes entries for three jar files: "A.jar" with an index of "1"; "B.jar" with an index of "2"; and "C.jar" with an index of "3". For each of these jar files a resource container is illustrated. Resource container 602 represents a jar file with a container identifier 6022 of "A.jar". Resource container 602 further has a timestamp 6024 with a value of "7". Additionally, resource container 602 includes two classes 6026 and 6028, each having a class identifier 60262 and 60282 with values "L" and "M" respectively. Resource container 604 represents a jar file with a container identifier 6042 of "B.jar". Resource container 604 further has a timestamp 6044 with a value of "4". Additionally, resource container 604 includes two classes 6046 and 6048, each having a class identifier 60462 and 60482 with values "Q" and "R" respectively. Resource container 606 represents a jar file with a container identifier 6062 of "C.jar". Resource container 606 further has a timestamp 6064 with a value of "5". Additionally, resource container 605 includes two classes 6066 and 6068, each having a class identifier 60662 and 60682 with values "T" and "U" respectively.

Referring now to FIG. 5, a example timeline comprising eighteen points in time is illustrated with events for these points in time indicated by a bold arrow with associated description. The time line and events occurring at particular points in time will now be used to demonstrate an aspect of the present invention in use. At time "4" the resource container 604 with the identifier "B.jar" is created. Hence, resource container 604 has a timestamp 6024 of "4". Similarly, at time "5" the resource container 606 with the identifier "C.jar" is created. Hence, resource container 606 has a timestamp 6064 of "5". Also, at time "7" the resource container 602 with the identifier "A.jar" is created. Hence resource container 602 has a timestamp 6024 of "7".

Figure 6B:
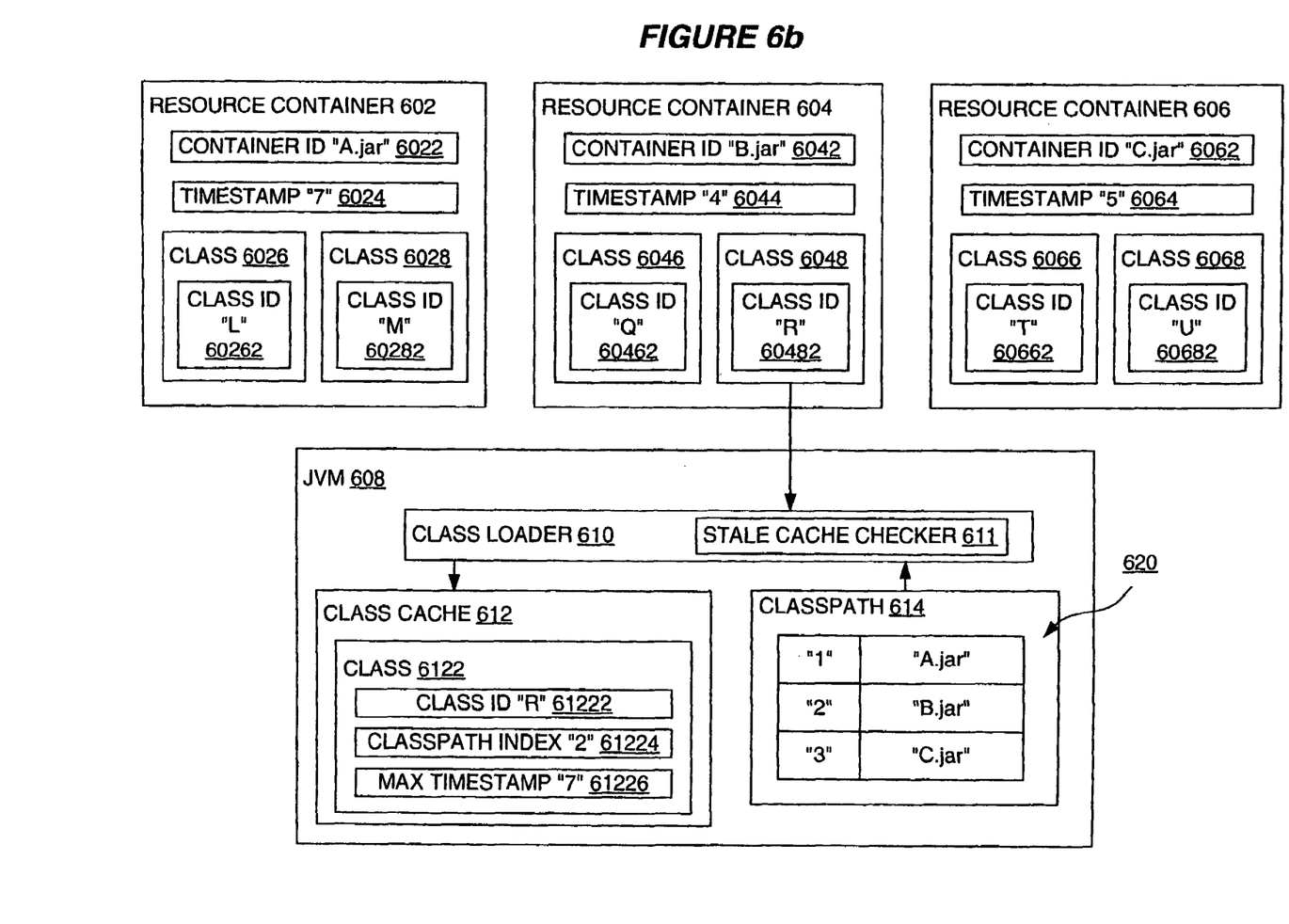
FIG. 6b is a block diagram of the Java virtual machine (JVM) of FIG. 6a with the class "R" loaded and cached in the class cache in accordance with an aspect of the present invention.

At time "10" the JVM 608 instructs the classloader 610 to load a class with the identifier "R". Referring to the method of FIG. 4a to load a resource with a required resource identifier, at step 402 the classloader 610 determines if a class with the required class identifier is stored in the class cache 612. The class cache 612 is empty so the method proceeds to step 406 where the method loads a class with the required class identifier from the resource containers 602, 604 and 606 using the method of FIG. 4b. Turning, therefore, to the method of FIG. 4b for loading a class with the class identifier "R", at step 420 a loop is initiated through all of the resource containers in the ordered list of jar files 620. Starting at the first jar file with an index of "1" ("A.jar"), the method determines at step 422 if the corresponding resource container 602 with the identifier "A.jar" contains a class with the class identifier "R". Resource container 602 does not contain a class with the class identifier "R" and so the method proceeds to step 428 where the method loops back to step 420 for the next jar file in the ordered list of jar files 620. For the next jar file with an index of "2" ("B.jar") the method determines at step 422 if the corresponding resource container 604 with the identifier "B.jar" contains a class with the class identifier "R". Resource container 604 does contain the class 6048 with the identifier "R" and so the method proceeds to step 424 where the class loader 610 loads class 6048 from resource container 604. Subsequently, at step 426, the class loader 610 creates a cached copy 6122 of class 6048 in the class cache 612. FIG. 6b is a block diagram of the JVM 608 of FIG. 6a with the class 6048 "R" loaded and cached in the class cache 612 in accordance with an aspect of the present invention. The cached copy 6122 of the class 6048 has a class identifier 61222 with a value of "R", and a classpath index 61224 with a value of "2". The classpath index 61224 is the index of the resource container 604 in the ordered list of jar files 620. Since resource container 604 has an identifier of "B.jar" and "B.jar" has an index of "2" in the ordered list of jar files 620, the classpath index 61224 of the cached class 6122 has a value of "2". The class 6122 in the class cache 612 also has a maximum timestamp 61226 with a value of "7". This is determined using the method of FIG. 4*d* as being the latest (highest) timestamp of all of the resource containers in the ordered list of jar files 620 up to and including the jar file with an index of the classpath index 61224. The jar file in the ordered list of jar files 620 with an index of the classpath index 61224 of "2" is "B.jar". Thus, the maximum timestamp is the latest timestamp of the resource containers with identifiers "A.jar" and "B.jar", these being the resource containers with an index in the ordered list of jar files 620 up to and including the value "2". The latest timestamp of the resource containers with identifiers "A.jar" and "B.jar" is the timestamp of resource container 602 which is "7". Hence, the maximum timestamp 61226 has the value "7".

Figure 6C:
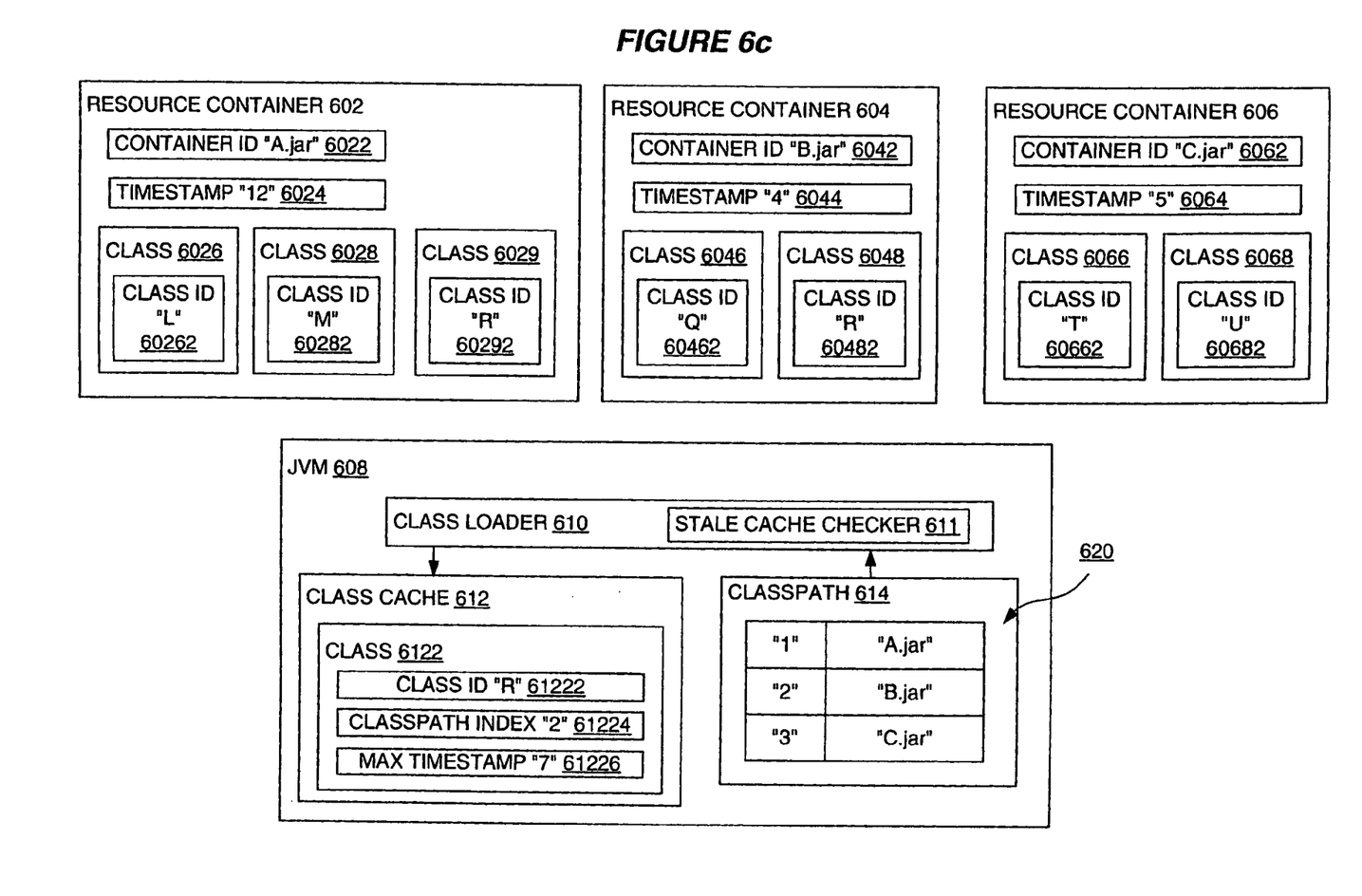
FIG. 6c is a block diagram of the Java virtual machine (JVM) of FIG. 6b with a new class "R" added to the "A.jar" Java archive (jar) file in accordance with an aspect of the present invention.

Referring again to FIG. 5, at time "12" a new class is added to resource container 602 ("A.jar") with a class identifier of "R". FIG. 6*c* is a block diagram of the JVM 608 of FIG. 6*b* with a new class 6029 "R" added to the "A.jar" Java archive (jar) file in accordance with an aspect of the present invention. FIG. 6*c* further includes a change to the value of the timestamp 6024 of resource container 602 to reflect the change to the resource container at time point "12". Further in FIG. 5, at time "14" the JVM 608 instructs the classloader 610 to once again load a class with the identifier "R". Referring to the method of FIG. 4*a* to load a resource with a required resource identifier, at step 402 the classloader 610 determines if a class with the required class identifier "R" is stored in the class cache 612. Class 6122 with the class identifier 61222 "R" is stored in the class cache 612 so the method proceeds to step 404. At step 404 the stale cache checker 611 determines if class 6122 in the class cache 612 is stale using the method of FIG. 4*c*.

Turning, therefore, to the method of FIG. 4*c* to determine if the cached class 6122 is stale, at step 440 a loop is initiated through all of the jar files in the ordered list of jar files 620, starting with "A.jar" corresponding to resource container 602. At step 442 the method determines if the timestamp 6024 of resource container 602 is greater than the maximum timestamp 61226 of the cached class 6122. The timestamp 6024 has a value of "12" (see FIG. 6*c*) and the maximum timestamp 61226 has a value of "7". Thus, the timestamp of resource container 602 is greater than the maximum timestamp 61226 of cached class 6122 and the method proceeds to step 444. At step 444 the method determines if resource container 602 contains a class with a class identifier value of "R" (corresponding to the class identifier 61222 of the cached class 6122). Resource container 602 does contains a class 6029 with the class identifier 60292 of "R" and so the method proceeds to step 446. At step 446 the method of FIG. 4*c* concludes that the class 6122 is stale.

Figure 6D:
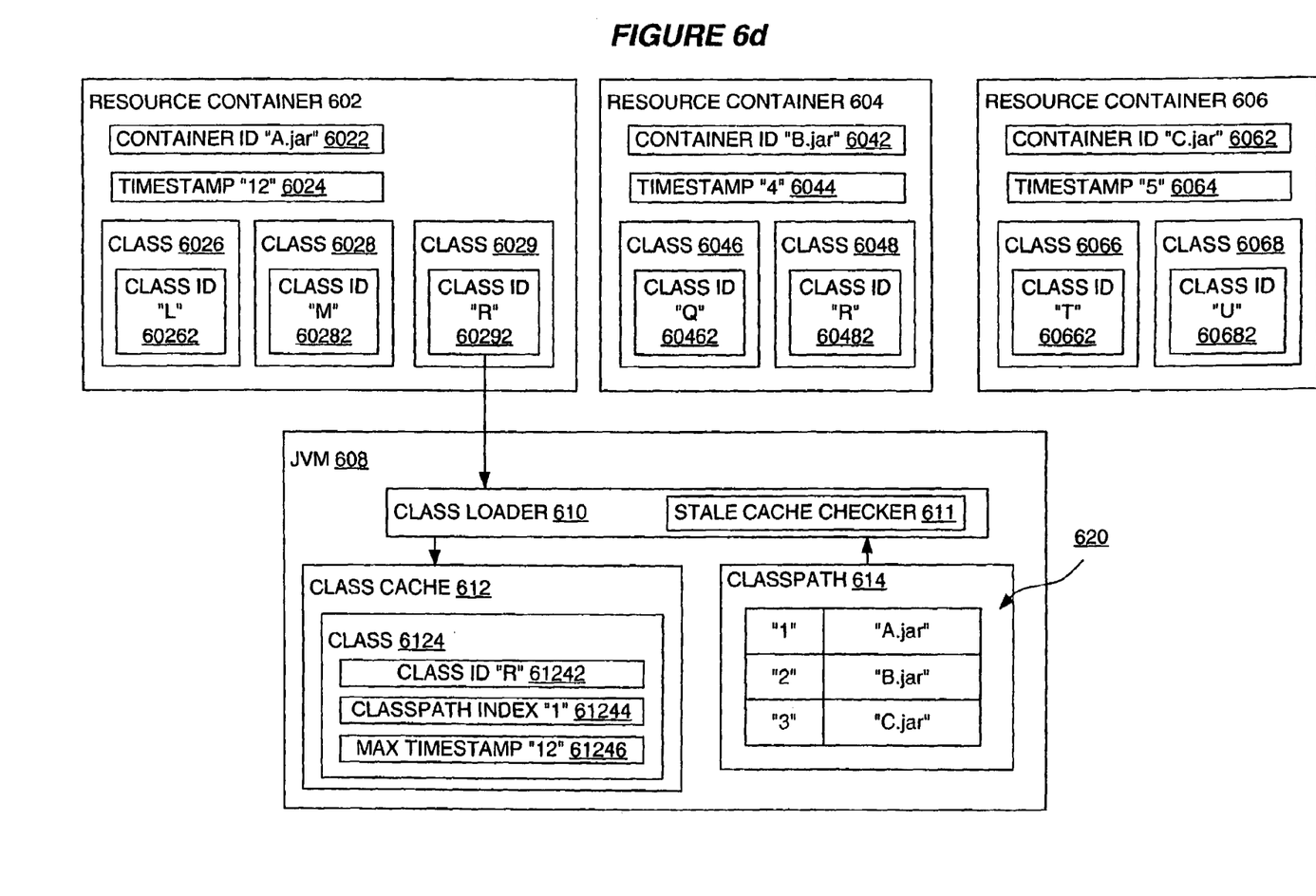
FIG. 6d is a block diagram of the Java virtual machine (JVM) of FIG. 6c with the class "R" loaded and cached in the class cache in accordance with an aspect of the present invention.

Thus, returning to the method of FIG. 4*a*, step 404 determined that class 6122 is stale and the method proceeds to step 406 where the method loads a class with the required class identifier from the resource containers 602, 604 and 606 using the method of FIG. 4*b*. Turning, therefore, to the method of FIG. 4*b* for loading a class with the class identifier "R", at step 420 a loop is initiated through all of the resource containers in the ordered list of jar files 620. Starting at the first jar file with an index of "1" ("A.jar"), the method determines at step 422 if the corresponding resource container 602 with the identifier "A.jar" contains a class with the class identifier "R". Resource container 602 does contain a class 6029 with the class identifier "R" and so the method proceeds to step 424 where the class loader 610 loads class 6029 from resource container 602. Subsequently, at step 426, the class loader 610 creates a cached copy 6124 of class 6029 in the class cache 612. FIG. 6*d* is a block diagram of the JVM 608 of FIG. 6*c* with the class 6029 "R" loaded and cached in the class cache 612 in accordance with an aspect of the present invention. The cached copy 6124 of the class 6029 has a class identifier 61242 with a value of "R", and a classpath index 61244 with a value of "1". The classpath index 61244 is the index of the resource container 602 in the ordered list of jar files 620. Since resource container 602 has an identifier of "A.jar" and "A.jar" has an index of "1" in the ordered list of jar files 620, the classpath index 61244 of the cached class 6124 has a value of "1". The class 6124 in the class cache 612 also has a maximum timestamp 61246 with a value of "12". This is determined using the method of FIG. 4*d* as being the latest (highest) timestamp of all of the resource containers in the ordered list of jar files 620 up to and including the jar file with an index of the classpath index 61244. The jar file in the ordered list of jar files 620 with an index of the classpath index 61244 of "1" is "A.jar". Thus, the maximum timestamp is the timestamp of the resource containers with identifier "A.jar", this being the resource container with an index in the ordered list of jar files 620 up to and including the value "1". Hence, the maximum timestamp 61246 has the value "12".

Figure 6E:
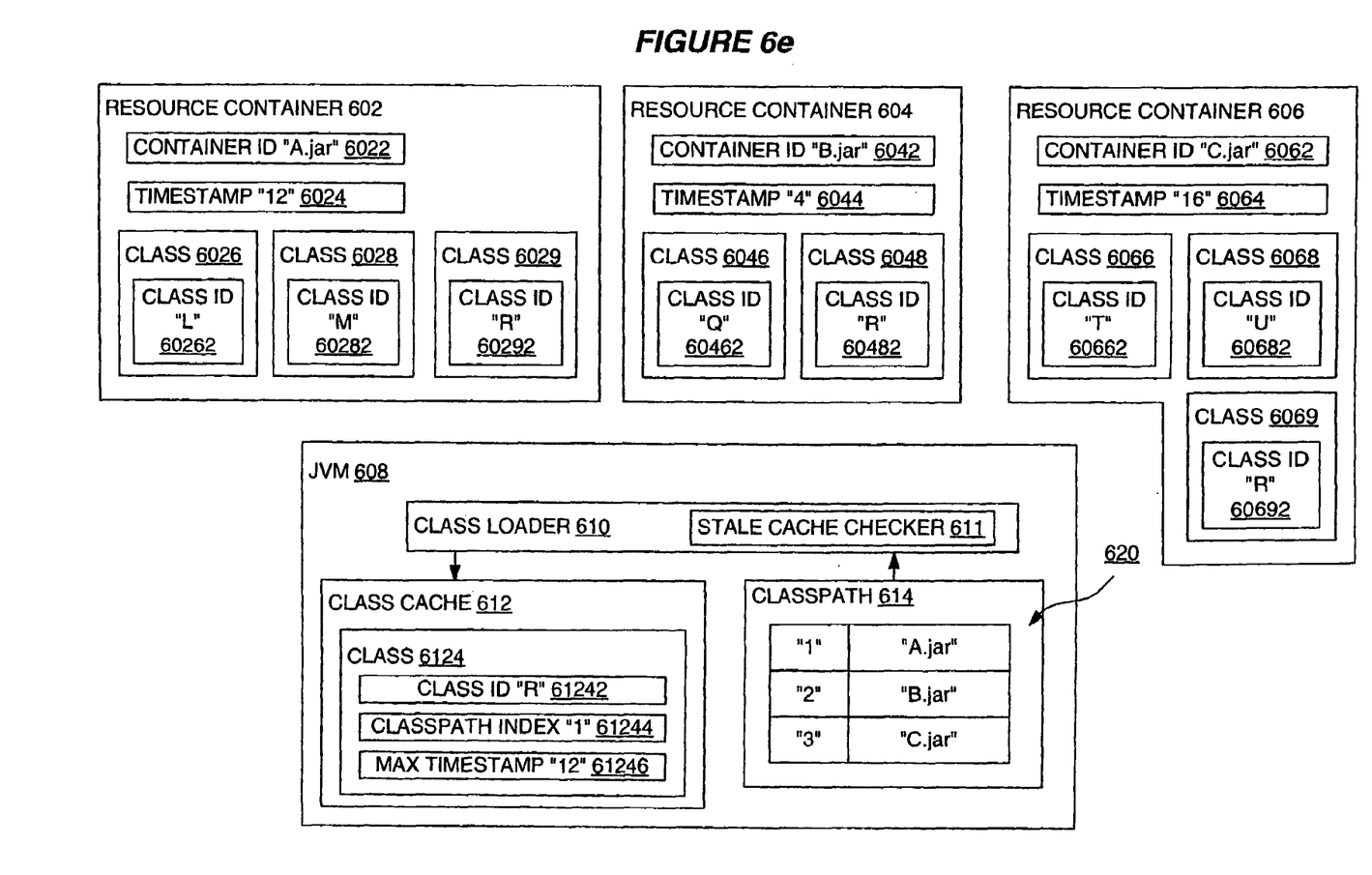
FIG. 6e is a block diagram of the Java virtual machine (JVM) of FIG. 6d with a new class "R" added to the "C.jar" Java archive (jar) file in accordance with an aspect of the present invention.

Referring again to FIG. 5, at time "16" a new class is added to resource container 606 ("C.jar") with a class identifier of "R". FIG. 6*e* is a block diagram of the JVM 608 of FIG. 6*b* with a new class 6069 "R" added to the "C.jar" Java archive (jar) file in accordance with an aspect of the present invention. FIG. 6*e* further includes a change to the value of the timestamp 6064 of resource container 606 to reflect the change to the resource container at time point "16". Further in FIG. 5, at time "18" the JVM 608 instructs the classloader 610 to once again load a class with the identifier "R". Referring to the method of FIG. 4*a* to load a resource with a required resource identifier, at step 402 the classloader 610 determines if a class with the required class identifier "R" is stored in the class cache 612. Class 6124 with the class identifier 61242 "R" is stored in the class cache 612 so the method proceeds to step 404. At step 404 the stale cache checker 611 determines if class 6124 in the class cache 612 is stale using the method of FIG. 4*c*.

Turning, therefore, to the method of FIG. 4*c* to determine if the cached class 6124 is stale, at step 440 a loop is initiated through all of the jar files in the ordered list of jar files 620, starting with "A.jar" corresponding to resource container 602. At step 442 the method determines if the timestamp 6024 of resource container 602 is not greater than the maximum timestamp 61246 of the cached class 6122. The timestamp 6024 has a value of "12" (see FIG. 6*e*) and the maximum timestamp 61246 also has a value of "12". Thus, the timestamp of resource container 602 is not greater than the maximum timestamp 61246 of cached class 6122 and the method proceeds to step 448. At step 448 the method determines if the index of the resource container 602 in the ordered list of jar files 620 is the same as the classpath index 61244 of the cached class 6124. The resource container 602 has container identifier "A.jar" which has an index of "1" in the ordered list of jar files 620. The classpath index 61244 of the cached class 6124 also has a value of "1". The method therefore proceeds to step 450 where the method determines that cached class 6124 is not stale.

Thus, returning to the method of FIG. 4*a*, step 404 determined that class 6122 is not stale and at step 408 the class loader 610 loads the class 6124 with the class identifier 61242 of "R" from the class cache 612. Thus, the examples charted by the timeline of FIG. 5 illustrate how aspects of the present invention illustrated in FIG. 3 and FIGS. 4a to 4d provide a mechanism for detecting stale resources in a resource cache without a need to refresh the resource cache and without a need to search through all resource containers in a resource search path to verify that the resource has not been updated. The inclusion of a container path index 326 provides an indicator of how much of the ordered container list 320 must be processed to determine if a cached resource 316 is stale. Further, the maximum timestamp 328 allows a determination that a cached resource is out of date.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for loading a resource in a software application, the software application comprising an ordered search path identifying at least one of a plurality of resource containers, each resource container of the resource containers having a timestamp and an index in the ordered search path, the method comprising:

loading, using a computer, the resource from an originating resource container, the originating resource container having an index in the ordered search path, the originating resource container is stored in a memory;

identifying a set of the resource containers in the ordered search path, each resource container of the set of the resource containers having an index less than or equal to the index of the originating resource container;

generating a cached resource as a copy of the loaded resource, the cached resource comprising the index of the originating resource container and a cached resource timestamp, the cached resource timestamp corresponding to a maximum timestamp of the resource containers in the set of resource containers, the cached resource is stored in a resource cache and the cached resource includes a resource identifier;

marking the cached resource as stale in response to a determination that (i) a resource container in the set of resource containers has a timestamp later than the cached resource timestamp, and (ii) an identified resource container comprises the resource having the resource identifier of the cached resource; and detecting stale resources in the resource cache without refreshing the resource cache and without searching the resource containers in a resource search path to verify that the resource has not been updated, wherein the detecting is based on the marking the cached resource as the stale, and the cached resource is a class.

2. The method of claim 1 wherein the software application is an object oriented software application and the resource is a class.

3. The method of claim 1 wherein the resource and the cached resource are software libraries.

4. The method of claim 1 wherein each of the resource containers comprise one of a file system directory, a library file and a class archive file.

5. The method of claim 1 wherein the cached resource is stored in a memory cache.

6. The method of claim 5 wherein the memory cache is a shared memory cache.

* * * * *